(12) United States Patent
Krajnc et al.

(10) Patent No.: US 11,006,510 B2
(45) Date of Patent: May 11, 2021

(54) VISUAL ALERTS IN A LIGHTING NETWORK

(71) Applicant: SIGNIFY HOLDING B.V., Eindhoven (NL)

(72) Inventors: Hugo Jose Krajnc, Eindhoven (NL); Remco Magielse, Tilburg (NL); Ashish Vijay Pandharipande, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/490,627

(22) PCT Filed: Feb. 26, 2018

(86) PCT No.: PCT/EP2018/054631
§ 371 (c)(1),
(2) Date: Sep. 3, 2019

(87) PCT Pub. No.: WO2018/158176
PCT Pub. Date: Sep. 7, 2018

(65) Prior Publication Data
US 2020/0008284 A1    Jan. 2, 2020

(30) Foreign Application Priority Data

Mar. 2, 2017   (EP) .................................... 17158848

(51) Int. Cl.
*H05B 47/19*   (2020.01)
*H05B 45/20*   (2020.01)
(Continued)

(52) U.S. Cl.
CPC ............... *H05B 47/19* (2020.01); *F21S 9/02* (2013.01); *H02J 9/065* (2013.01); *H05B 45/20* (2020.01);
(Continued)

(58) Field of Classification Search
CPC .. H05B 41/28; H05B 41/295; H05B 33/0815; H05B 41/3921; H05B 41/3927;
(Continued)

(56) References Cited

U.S. PATENT DOCUMENTS 9,396,599 B1 *  7/2016  Malhotra ............ H04L 12/2803
2008/0266076 A1  10/2008  Barrieau et al.
(Continued)

FOREIGN PATENT DOCUMENTS

EP           2573630 B1      5/2017

*Primary Examiner* — Minh D A
(74) *Attorney, Agent, or Firm* — Meenakshy Chakravorty

(57) ABSTRACT

A controller for controlling a battery-powered luminaire in a lighting network comprises: a network interface for communicating with the lighting network; and control logic for controlling at least one illumination source of the battery-powered luminaire; wherein the control logic is configured to: detect a failure of at least one mains-powered luminaire in the lighting network, determine that the mains-powered luminaire was emitting or had been instructed to emit a visual alert when the failure occurred, and control the at least one illumination source of the battery-powered luminaire to emit a version of that visual alert in response, the failure being detected based on a loss of communication, within the lighting network, with the mains-powered luminaire.

14 Claims, 3 Drawing Sheets

(51) Int. Cl.
  *H05B 47/11*   (2020.01)
  *H05B 47/29*   (2020.01)
  *H05B 47/105*  (2020.01)
  *F21S 9/02*    (2006.01)
  *H02J 9/06*    (2006.01)

(52) U.S. Cl.
  CPC ........... *H05B 47/105* (2020.01); *H05B 47/11* (2020.01); *H05B 47/29* (2020.01)

(58) Field of Classification Search
  CPC ............ H05B 41/2828; H05B 33/0818; H05B 41/2827; H05B 37/029; H05B 33/0803; H05B 37/0254; H05B 37/02; H05B 45/20; H05B 47/11; H05B 47/29; H05B 47/105; Y02B 20/202; Y02B 20/40; F21S 9/02; H02J 9/065
  See application file for complete search history.

(56) References Cited

U.S. PATENT DOCUMENTS

| | | | |
|---|---|---|---|
| 2011/0254554 A1* | 10/2011 | Harbers | G01K 11/00 |
| | | | 324/414 |
| 2013/0020943 A1 | 1/2013 | Jonsson | |
| 2014/0132183 A1 | 5/2014 | Van Herpen | |
| 2015/0035437 A1* | 2/2015 | Panopoulos | F21V 14/02 |
| | | | 315/112 |
| 2015/0061502 A1 | 3/2015 | Rains, Jr. et al. | |
| 2015/0296599 A1 | 10/2015 | Recker et al. | |
| 2016/0300478 A1 | 10/2016 | Kubis et al. | |

* cited by examiner

VISUAL ALERTS IN A LIGHTING NETWORK

CROSS-REFERENCE TO PRIOR APPLICATIONS

This application is the U.S. National Phase application under 35 U.S.C. § 371 of International Application No. PCT/EP2018/054631, filed on Feb. 26, 2018, which claims the benefit of European Patent Application No. 17158848.6, filed on Mar. 2, 2017. These applications are hereby incorporated by reference herein.

TECHNICAL FIELD

The present invention relates to luminaires in a lighting network which can be controlled to emit visual alerts. It has various applications, including but not limited to security and safety systems.

BACKGROUND

Connected lighting refers to a class of lighting system in which the lights (luminaires) can be controlled based on the communication of data between the lights and a controlling device (such as a smartphone, tablet, smart-switch etc.) using network technology, according a network communications protocol or combination of such protocols, such as ZigBee, Bluetooth, Wi-Fi, Ethernet, Z-Wave, Thread etc. This allows a connected lighting system to provide richer functionality than traditional lighting systems, for example allowing a user to directly control the lights using an application (app) executed on a smartphone, wearable device or other user device, and to easily incorporate new control points, such as light switches or sensors, into the lighting system, or change the configuration of existing control points, without rewiring it.

US2008/266076A1 discloses a fire alarm system which comprises lamps that may be powered by a battery.

SUMMARY

Connected lighting systems may be used emit visual alerts as a result of a specific condition in a house or other environment, to alert a user(s) to that condition, e.g. detected smoke in a safety application or a detected intruder in a security application etc. However, there is a problem with the use of mains-powered luminaires in this context as they can be disabled when their supply of mains power is cut off, for example due to damage caused by a fire or deliberately by an intruder.

The present invention solves this problem by using a battery-powered luminaire to emit a version of a visual effect that was being emitted by a mains-powered luminaire when a failure of the mains-powered luminaire occurred, in response to a controller of the battery-powered luminaire detecting the failure and determining that the visual effect was being emitted by the mains-powered luminaire when the failure occurred. In other words, the mains-powered luminaire is assigned an alert role within the lighting network and is operating according to that assigned role when it fails; the battery-powered luminaire assumes this alert role when the mains-powered luminaire fails in order to compensate for the failure. Before this takeover, the battery-luminaire may not be emitting any visual alert i.e. it only begins doing so in response to the failure of the mains-powered luminaire fails. Alternatively it may be emitting its own initial version of the visual alert when the mains-powered luminaire fails, which is modified in response to the failure to compensate for the failure (e.g. to make it more noticeable, by increasing its brightness, changing its colour or changing a dynamic property of it etc.); that is, it assumes the alert role of the failed mains-powered device on top of its exiting alert role.

A first aspect of the present invention is directed to a controller for controlling a battery-powered luminaire in a lighting network, the controller comprising: a network interface for communicating with the lighting network; and control logic for controlling at least one illumination source of the battery-powered luminaire; wherein the control logic is configured to: detect a failure of at least one mains-powered luminaire in the lighting network, determine that the mains-powered luminaire was emitting or had been instructed to emit a visual alert when the failure occurred, and control the at least one illumination source of the battery-powered luminaire to emit a version of that visual alert in response, the failure being detected based on a loss of communication, within the lighting network, with the mains-powered luminaire.

A second aspect of the present invention is directed to a battery-powered luminaire for use in a lighting network, the battery-powered luminaire comprising: a battery configured to power the luminaire; at least one illumination source for emitting light to provide illumination; and the controller. Alternatively, the controller can be (part of) a separate device, for example an external battery-powered controller (which could be a dedicated stand-alone controller, or a second battery-powered luminaire). The controller could also be part of a central control device of the lighting network (e.g. bridge) that could be mains powered, provided the battery-powered luminaire is able to communicate with the bridge (and if the bridge becomes unreachable, for example because it loses power, local control logic of the battery-powered luminaire can take over).

Depending on the circumstances, it may be that, for example, the mains-powered luminaire was already emitting a visual alert when it failed, or that it had been instructed to do so by a controller but failed before it could begin emitting the visual alert as instructed.

In embodiments, the control logic may be configured to modify at least one visual characteristic of the visual alert, the version of the visual alert emitted by the battery-powered luminaire exhibiting the modified visual characteristic.

The at least one modified visual characteristic may comprise: an increased light intensity, an increased rate of dynamic variations, and/or a modified colour of light.

The failure of the mains-powered luminaire may occur when the at least one illumination source of the battery-powered luminaire is emitting an initial version of the visual alert, and in response to said determination the control logic may modify the initial version of the visual alert emitted by the battery-powered luminaire so as to cause it to exhibit the modified visual characteristic.

The control logic may be configured to disable a local user input device of the battery-powered luminaire whilst the version of the visual alert is being emitted by the battery-powered luminaire, thereby preventing local termination of that alert at the battery-powered luminaire.

The control logic may be configured to control the at least one illumination source of the battery-powered luminaire to emit the version of the visual alert based on sensor data received from a sensor via the network interface.

The sensor data may be received initially from the sensor via a control node of the lighting network, and the control logic may be configured, in response to detecting a failure of the control node, to attempt to connect to the sensor of the lighting network directly or via one or more nodes of the lighting network other than the control node, to continue receiving the sensor data.

The failure of the mains-powered luminaire may be one of series failures detected in the lighting network by the control logic, wherein the control logic may be configured to apply an analysis to the series of failures, and control the at least one illumination source of the battery-powered luminaire to emit the version of the visual alert in response to the analysis determining that the series of failures is unexpected.

The control logic may be configured to apply successive modifications to the lighting effect in response to continuing unexpected failures in the lighting network.

A second aspect of the present invention is directed to a battery-powered luminaire for use in a lighting network, the battery-powered luminaire comprising: a battery configured to power the luminaire; at least one illumination source for emitting light to provide illumination; and a controller according to the first aspect or any embodiment thereof.

A third aspect of the present invention is directed to a method of controlling a battery-powered luminaire in a lighting network, the method comprising steps of: detecting a failure of at least one mains-powered luminaire in the lighting network, the failure being detected based on a loss of communication, within the lighting network, with the mains-powered luminaire; determining that the mains-powered luminaire was emitting or had been instructed to emit a visual alert when the failure occurred; and controlling the at least one illumination source of the battery-powered luminaire to emit a version of that visual alert in response.

In embodiments, any feature of the first aspect or any embodiment thereof can be implemented in performing the method.

A third aspect of the present invention is directed to a computer program product comprising code stored on a computer readable storage medium and configured when executed to implement the method of the second aspect or any embodiment thereof.

BRIEF DESCRIPTION OF FIGURES

For a better understanding of the present invention, and to show how embodiments of the same may be carried into effect, reference is made to the following figures in which.

DETAILED DESCRIPTION OF EXAMPLE EMBODIMENTS

Connected lighting systems provide users with the option to use lamps and other luminaires not just for traditional functional lighting or even ambiance creation, but also as notification sources for a variety of events. These events can be both local (e.g. blink kitchen lights red if there is smoke detected) or global/external (e.g. turn lights blue if it is about to rain). Depending on the type of trigger, these events are notified to the system via a software or cloud-based service (e.g. IFTTT), via a device incorporated in the lighting network such as a sensor, or another type of device in a second smart system, such as a connected thermostat.

Using these capabilities of connected lighting systems, the lights can also be used to both deter intruders from breaking in into a home or generating noticeable light effects to scare them away and/or visually notify inhabitants and neighbors of the situation. For example, a motion sensor or security camera can detect presence in a home after the system has been put into a "security mode" by a user. As a result of this detection, all lights in the house can be set to blink at full brightness as a notification effect, to alert people in their vicinity to the potential intruder (for example).

It is expected that, as adoption of these connected lighting systems and features grows, disabling their operation becomes a critical and high priority action for burglars and other intruders as they break in. This can include disabling/powering-off central control units (e.g. a bridge of the lighting network) such that even in the event of a detection this does not get processed into a visual notification in the home's lights or disabling an internet connection for those systems relying on cloud processing such that information of a break in never gets out of the home to e.g. alert security services. The current architectures of most connected lighting systems are vulnerable to some of these actions and as such can discourage users from investing in the system or prove a liability in case of a malfunction.

A particular problem addressed by the described embodiments of the present invention is when mains-powered luminaires generating alerts are cut off from the mains, are damaged, or otherwise fail, e.g. an intruder may power them off via legacy wall switches after they are seen displaying this effect such that the impact of the notification is minimized over time, or they may be destroyed as fire spreads. The described embodiments address this with counter-measures that comprise adapting the functionality of battery-based devices in such situations to compensate.

Figure 1:
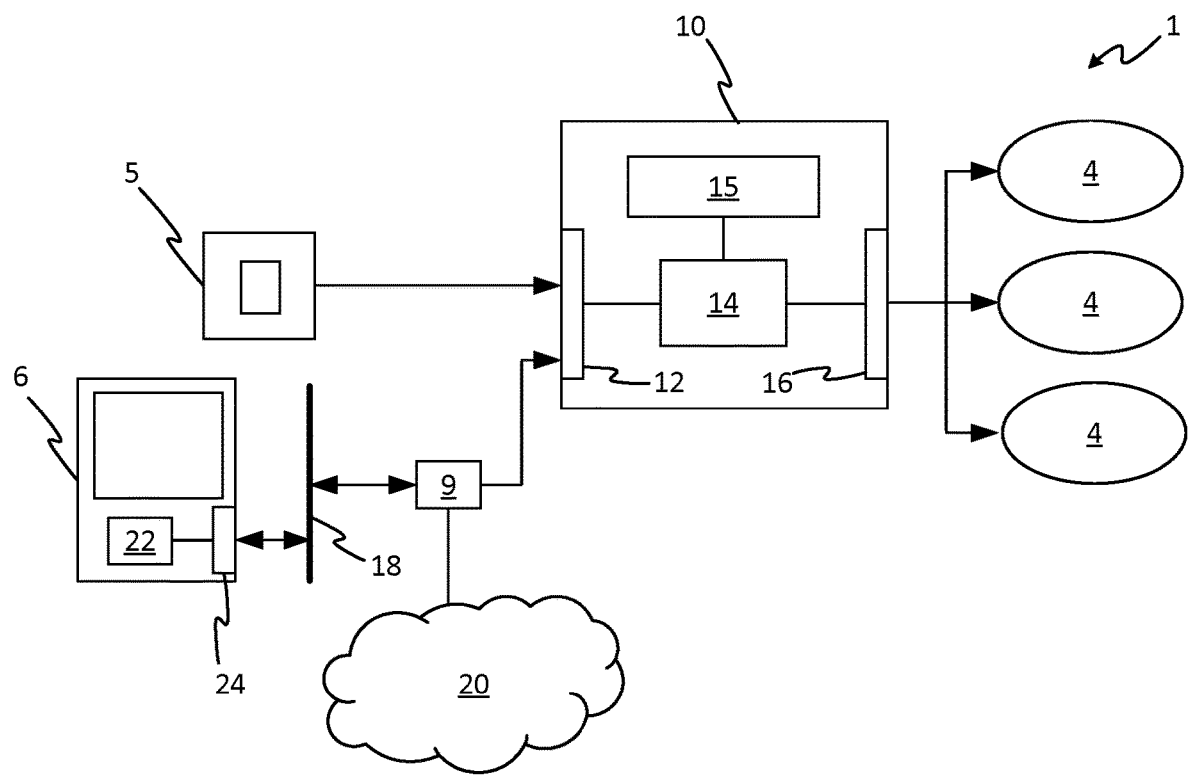
FIG. 1 shows a schematic block diagram of a connected lighting system.
Figure 2:
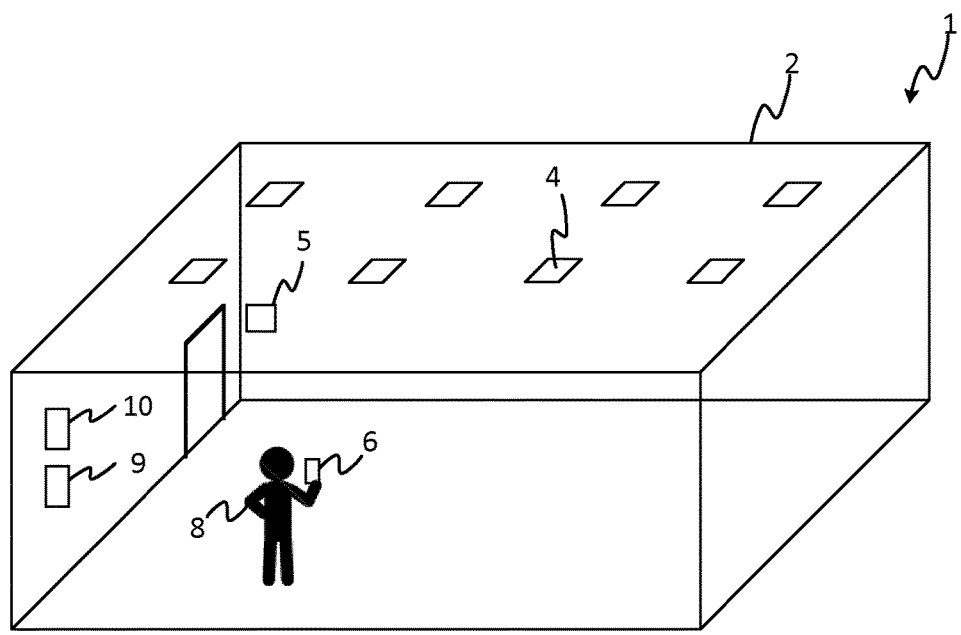
FIG. 2 shows a perspective view of the lighting system arranged in an environment.

With reference to FIGS. 1 and 2, embodiments of the present invention will now be described in the context of a connected lighting system 1. The lighting system 1 has an alert mode, which the system 1 adopts in response to detection of some undesired event in an environment 2 (fire, intruder etc.), in which at least one luminaire of the lighting system is emits a visual alert to alerts any person or people in its vicinity to alert him/them to the undesired event. In the described embodiments, battery-based luminaires play a key role in the emitting of visual alerts in case that main-powered devices fail (e.g. burglar turns off blinking lights via legacy wall switch, lamps broke due to fire). This has the goal of ensuring an extended, robust effect of the alert such that intentional or accidental malfunctions do not fully override the notification towards the user, or diminish its effectiveness.

FIG. 1 shows a schematic block diagram of the lighting system 1, and FIG. 2 shows an example of how the lighting system 1 may be arranged in the environment 2 so as to illuminate the environment 2. The environment 2 can comprise an indoor space within a building, such as one or more rooms and/or corridors (or part thereof) and/or an outdoor space such as a garden or park, or a partially-covered space such as a stadium or gazebo (or part thereof), or a combination of such spaces. In the described examples, the environment 2 is the user's home, or part of his home spanning several rooms of the home, and possibly extending into an outdoor space such as a garden or balcony. The lighting system 1 comprises one or more luminaires (lights) 4, which can for example be ceiling-mounted (as shown), so as to be able to illuminate a surface below them (e.g. the ground or floor, or a work surface), mounted on the wall, embedded in the floor or items of furniture, portable luminaires etc. or any combination thereof. Each of the luminaires 4 comprises at least one illumination source, i.e. a light emitting device such as an LED-lamp, gas-discharge lamp or filament bulb, plus any associated housing or support. Each of the luminaires 4 may take any suitable form such as a ceiling or wall mounted luminaire, a free standing luminaire (e.g. table lamp, desk lamp or floor lamp etc.), a wall washer, or a less conventional form such as an LED strip, a luminaire built into a surface or an item of furniture, or any other type of illumination device for emitting illumination into the environment 2 so as to illuminate the environment 2. For example, functional illumination (that is, to emit light of sufficient intensity and over a sufficiently large area that the user 8 in the environment 2 can see his surroundings as a consequence of the illumination), or which can at least provide aesthetic illumination to create a desired ambience in the environment 2. There are at least two separate controllable luminaires 4 in the lighting system 1, of which at least one is mains-powered and at least another one is battery-powered, and could for example be portable.

In addition to the luminaires 4, the lighting system 1 is shown to comprise a central control device in the form of a gateway 10, sometimes referred to as a lighting bridge. The bridge 10 is shown to comprise a first communication interface 12, a second communication interface 16 and a processor 14 connected to the first and second interfaces 12, 16. The bridge 10 is also shown to comprise memory 15 connected to the processor 14. Each of the luminaires 4 is shown connected to the bridge 10 via the second interface 16. For example the luminaires 4 may form a wireless mesh network where at least some of the luminaires 4 act as relays to relay data between the bridge 10 and other luminaires 4 (that is, at least some of the luminaires 4 connect to the bridge 10 indirectly, via one or more other luminaires 4). This wireless mesh network configuration can extend the range of the network beyond the direct communication range of the second interface 16. For example, the second interface 16 may be a ZigBee interface, where the luminaires 4 and the bridge 10 form a ZigBee network. In order to control the luminaires 4 via the bridge 10, at least one user input device can connect to the first interface 12 of the bridge 10, for example via a wireless connection such as Wi-Fi or Bluetooth or a wired connection e.g. based on Ethernet. These examples are not exhaustive, and other network protocols such as Thread, Z-Wave etc. can also be used. The user input device can for example a general-purpose user device 6 executing a lighting control application (app), such as a smartphone, tablet, wearable device, home automation hub (e.g. based on voice control) or any other general-purpose computing device, or a light switch 5 equipped with network communication technology (smart switch). In this example a user device 6 is shown connected to the bridge 10 via a local area network 18 provided by a network router 9, such as a Wi-Fi router. In some cases it may also be possible to connect to the bridge 10 from an external network 20 such as the Internet (e.g. e.g. via the router 9) to allow the user 8 to control the luminaires 4 remotely. The user device 6 is shown to comprise a processor 22 on which the lighting control app (not shown) is executed and a network interface 24 via which the processor 22 of the user device 6 can connect to the local area network 18, for example via a Wi-Fi connection. Alternatively the user device 6 can connect to the bridge 10 directly, for example via a Bluetooth connection. It is also possible to implement a connected lighting system without the bridge 10, in which case the various user input devices 5, 6 can control the luminaires 4 by communicating with them directly, for example using Bluetooth (such that neither a bridge 10 nor a router 9 required); alternatively, the luminaires 4 may connect directly to, say, the local network 18, so they can be controlled via the router 9 (such that no bridge 10 required). The bridge 10 may be a dedicated control device, or it could be part of one of the luminaires 4.

By way of example FIG. 2 shows a smart switch 5 disposed in the environment 2 along with the gateway 10 and router 9 with the user device 6 held by the user 8. However as will be appreciated this is merely an example for the purposes of illustration and various other arrangements and configurations are equally viable.

In normal operation, a central control device of the lighting system, which is preferably the bridge 10, acts as a coordinator and "brains" of the overall system 1, determining different effects to be rendered by the luminaires 4 as a result of different possible inputs to the system. However, in accordance with the described techniques, the battery-powered luminaires also have their own local control logic (34, FIG. 3), which is able to essentially take over at least some aspects of the bridge's role should the bridge 10 become unreachable.

The lighting system 1 also has a mechanism to detect if an occurrence of one of a set of undesired conditions occurs, such as a sensor to detect water leakage, smoke sensor to detect fires, camera or motion sensor to detect unwanted intruders, etc. and a mechanism for the user to decide whether the system should react to such detections or not, i.e. whether the system should enter the alert mode in response.

The lighting system 1 also has a mechanism for battery-based luminaires to detect that relevant elements of the network (bridge 10 and other lamps 4, main-powered ones in particular) have become unreachable/disabled while in the alert mode. That is, to detect a failure of such devices based on a loss of communication with those devices within the lighting system 1. It also has mechanism for the battery-based devices to adopt additional functionalities, e.g. establish direct communication with, or periodically poll status of sensors, to trigger visual effects or modify existing ones as a result of the detection.

The alert mode can be cancelled by various different means, such as an extended timeout, restoring the system from the faulty conditions that triggered it (e.g. re-connect bridge), or only after a specific trigger is received via a "trusted" source, such that the system knows that the alert has indeed ended and that it is not disabled by an accident or to cover up the incident.

Figure 3:
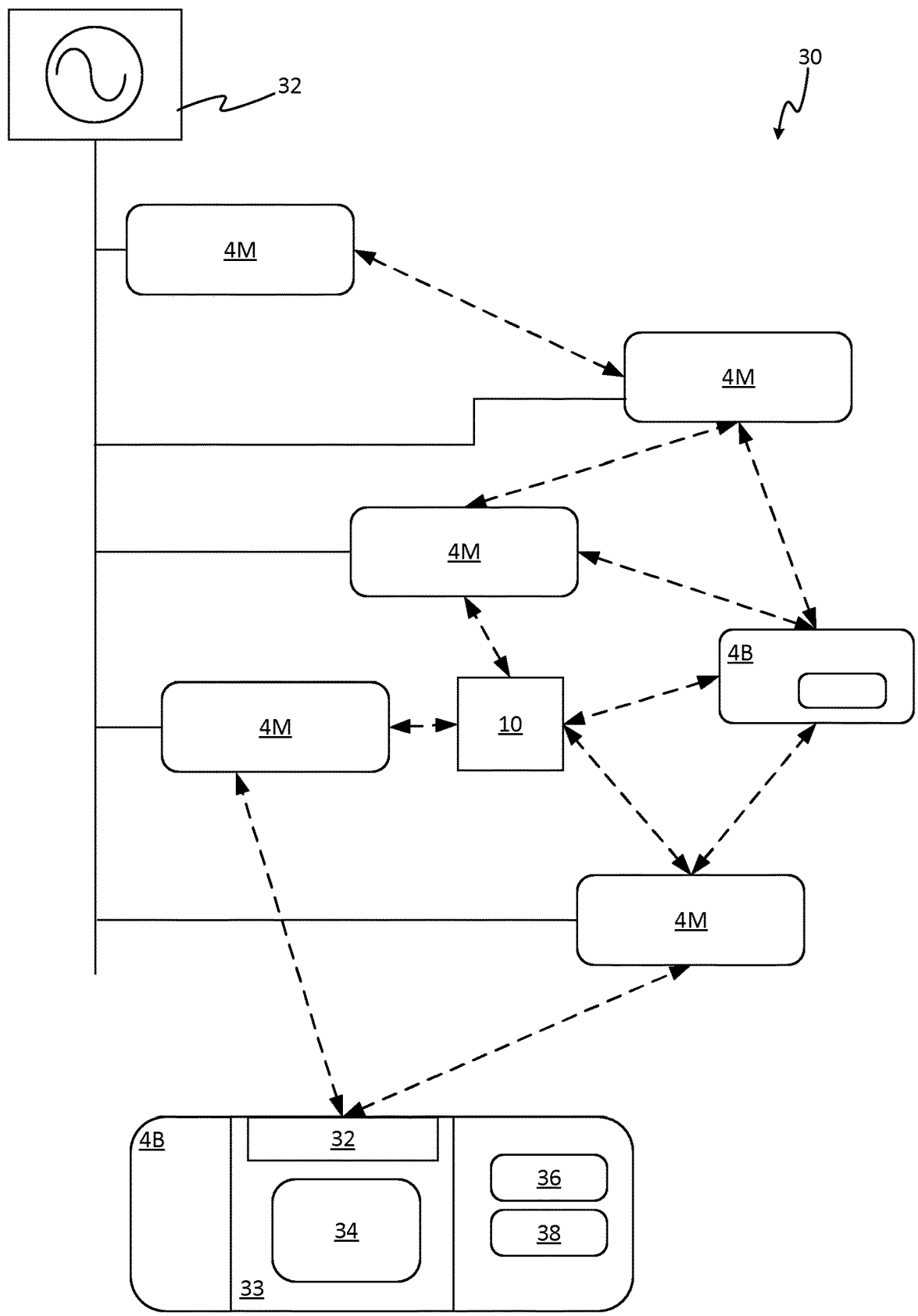
FIG. 3 shows an example of mains and battery-powered luminaires in a lighting network having a mesh topology.

FIG. 3 illustrates how luminaires 4 of the lighting system 1 can form a lighting network 30, based on one or more network protocols, including but not limited to any of those mentioned above or any combination thereof. Luminaires labelled 4M in the lighting network 30 are mains powered. That is, they receive electrical power from a mains electricity system 32 (the mains), and can no longer function if disconnected from the mains 32. Note, not all mains-powered luminaires 4M need to be connected to the same mains source, e.g. lamps can be connected to different phases, and as such cutting power via a junction box might not necessarily mean turning power off to all of the phases.

Luminaires 4B in the lighting network are battery powered, and as such do not require an electrical connection to the mains 32. Note the term "battery-powered luminaire" covers both luminaires with no mains connection capability, but also luminaires that can electrically connect to the mains 32 to receive power but include a back-up battery so that they can continue operating normally if that connection is lost. The bridge 10 is also shown as part of lighting network 30, where the luminaires 4 and the bridge 10 are nodes of the lighting network 30, the bridge 10 being a central control node for the lighting network 30.

As illustrated by the two-way dashed arrows in FIG. 3, there may be various communication paths though the lighting network 30, via which data can be communicated between each pair of luminaires and each luminaire and the bridge 10. Data is preferably communicated between the nodes of the lighting network 30 wirelessly, but it could be communicated to/from at least one of the nodes via a wired connection, such as a network cable or even via the electrical wires of the mains system 32 itself, by modulating the electrical current or voltage they carry.

Luminaires within range of the bridge 10 can transmit and receive data to/from the bridge 10, and also relay data to/from the bridge on behalf of other luminaires in the lighting network 30. That is, luminaires can connect to the bridge 10 directly or via one or more other luminaires in the lighting network 30. Likewise, luminaires may also be able to communicate with other luminaires in the lighting network 30 either directly or via one or more other luminaires in the lighting network 30 (with or without going via the bridge 10). There may be multiple communication paths between two given nodes in the lighting network 30, meaning that should one of those communication paths fail due to failure of a node in the network, such as one of the mains-powered luminaires 4M losing mains power or being otherwise disabled, or the bridge being 10 disabled, it may still be possible to communicate data between those nodes via an alternative one of the paths.

Further details of one of the battery-powered luminaires 4B are shown in FIG. 3. In, particular, it is shown to comprise a controller 33, at least one illumination source 36 (preferably a set of LEDs) for emitting light to provide illumination, and a battery 38 which powers the illumination source 36 and the controller 33. The controller 33 comprises a network interface 32 for communicating within the lighting network 30 and control logic 34 for controlling the illumination source 38. The control logic 34 preferably comprises a processor (such as a CPU or CPUs) or processors, wherein the described functionality of the control logic 34 is implemented in software. That is, by computer-readable instructions executed by the processor(s). The computer readable instructions are fetched by the processor from memory for execution, and executed to cause the processor to carry out the functionality of the control logic 34. For example, the processor and memory can be embodied in a microcontroller of the controller 33. However, the possibility of implementing at least part of this functionality in dedicated hardware, such as an application-specific integrated circuit or FPGA, is not excluded. In general, the term control logic means software, hardware or any combination thereof configured to carry out the functionality in question. As indicated, at least part of the controller 33 can also be implemented externally of the battery-powered luminaire 4B, and one controller can control multiple battery-powered luminaires.

Figure 4:
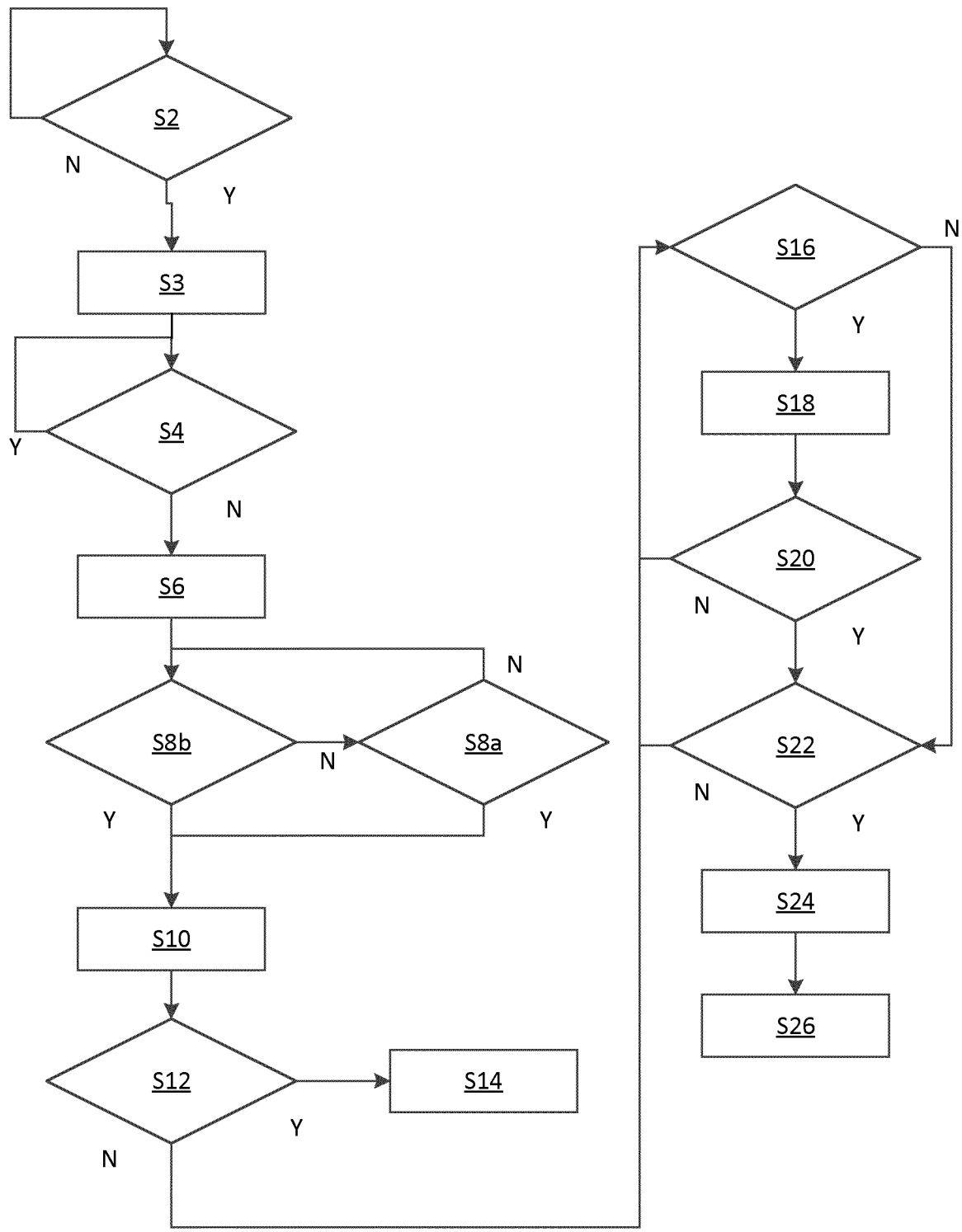
FIG. 4 shows a state diagram for a method of controlling a battery-powered luminaire.

Although details of only one battery-powered luminaire 4B are shown in FIG. 4, if there are multiple battery-powered luminaires in the lighting network each can have the described configuration, to allow it to implement the techniques described herein.

FIG. 4 shows a state diagram for a method of controlling one or more a battery-powered luminaires 4B in the lighting network 30.

The method begins at step S2 ["Is system in alert mode?"], with the luminaires 4M, 4B operating in a normal mode of operation, according to whichever illumination settings have been applied to them, for example to emit desired illumination or in a non-emitting state, as set by a user or by a schedule etc. This continues for as long as the normal mode of operation remains selected.

If and when a transition takes place from the normal mode of operation to the alert mode, for example as caused by detected smoke, a detected intruder or some other undesired condition acting as an alert mode trigger, the system transitions to the alert mode in response and the method proceeds to step S3, at which at least one of the mains powered luminaires 4M in the lighting network 30 is controlled to emit a visual alert of the undesired condition in accordance with the selected alert mode. Various examples of different types of visual alert are given below. For example, depending on the implementation, this could be just one of the mains powered luminaires 4M, all of the mains powered luminaires 4M and all of the battery powered luminaires 4B, or anything in between. The alert mode remains selected for as long as the bridge 10 and all of the mains-powered luminaires 4M are still on and reachable within the lighting network 30.

At step S4 ["Are bridge and lamps still online/available?"], the controller checks whether all of the lamps in the lighting network 300 are still reachable. If any of the mains luminaires 4M or the bridge becomes unreachable on the lighting network 30, the method proceeds to step S6 ["Go into "Enhanced Alert" mode"], at which a transition takes place form the alert mode to an enhanced alert mode.

Note that an overall evaluation at step S4 to determine whether all of the nodes in question are still reachable can in fact be multiple evaluations taken at different places within the lighting network 30. In particular, the control logic 34 of the (or each) battery-powered luminaire 4B can assess whether all of the mains powered luminaires 4M and the bridge 10 are reachable to it, and if not then it selects the enhanced alert mode for that battery-powered luminaire 4B locally. The bridge 10 and mains-powered luminaire 4M can also contribute to this evaluation for as long as they remain active and reachable via the lighting network 30.

Note that in many contexts, a single lamp, or even the bridge, becoming disconnected may not be a cause for immediate concern; a device becoming unreachable is a reasonably common occurrence in lighting network, particularly wireless mesh networks. Therefore, in some embodiments, whilst the enhanced alert mode selected (as a precaution), the lighting network 30 is monitored (S8a; "Is drop in availability suspicious?") to determine whether or not nodes are becoming unreachable in a manner that is considered "suspicious", i.e. unexpected failure activity for the lighting network 30 in question that constitutes a real cause for concern. For example, multiple nodes becoming unreachable in turn over a relatively short time interval, and/or in a particular pattern, can indicate the presence of an intruder switching them off systematically or a fire destroying them as it spreads. A series of failures in the lighting network 30 can be analyzed by the control logic 34 to determine whether or not it is unexpected (i.e. outside of normal operating parameters for the lighting network, thus indicating exceptional circumstances like a fire or intruder) This can take into account the topology of the network, to distinguish between nodes that are becoming unreachable because other nodes relaying on their behalf in the light lighting network 30 are becoming unreachable, and nodes are becoming unreachable because they are failing themselves. Again, this can be determined locally by the control logic 34 of each battery-powered luminaire 4B where necessary.

If unexpected failure activity is detected at step S8a, the method proceeds to step S10 ["Deploy "Enhanced Alert" light effect"], wherein the battery-powered luminaire is controlled to emit an enhanced visual alert, which persists unless the enhanced alert mode is disabled (S14), for example by an authorized user, or some other termination event takes place (see below), as determined at step S12 ["Is "Alert" mode cancelled?"].

Note also that, in some cases, the method can also proceed to step S10 if a further undesired event is detected (S8b; "Are events detected?"), i.e. on top of the event that causes the (non-enhanced) alert mode to be selected at step S2, such as a further trigger from a sensor (e.g. presence sensor, smoke detector, heat sensor or other fire detector) confirming the likely presence of a fire or an intruder that was indicated at step S2. Normally, the battery-powered luminaire 4B would connect to the sensor via the bridge 10, with the bridge 10 controlling the battery-powered luminaire 4B based on sensor data from the sensor. However, if the bridge becomes unavailable, the battery-powered luminaire 4B can attempt to connect to the sensor directly in response. That is, if the bridge 10 other central node which passed on an initial trigger causing the notification effect to start becomes unavailable in the network 30, the battery powered luminaire 4B can start interacting with (e.g. polling) the sensor directly. The control logic 34 of the battery-powered luminaire 4B can regularly check for the presence of the bridge 10 in the network 30, e.g. via manufacturer-specific ZigBee commands. A few seconds after the bridge 10 is unplugged the battery-powered luminaire 4B detects it is missing and therefore triggers the enhanced alert mode. In this case, this means establishing a direct link to the sensor such that detections are reported to battery-powered luminaire 4B instead of aiming to go to the disconnected bridge. This can be done by direct messages from the sensor to the battery-powered luminaire 4B, or by the battery-powered luminaire 4B regularly (e.g. every second or so) polling the sensor.

Note that although steps S8b and steps S8a are shown in that order in the figure—i.e. from step S6 to step S8b, and then to step S8a if the "no" branch is followed from step S8b (i.e. no further undesired event), they can be performed in any order or in parallel.

The enhanced alert of step S10 is a version of a visual alert that was previously being emitted by a mains powered luminaire 4M at the time of its failure. Up to this point, the battery-powered luminaire 4B may not have been emitting any visual alert, in which case this transition to step S10 is the first time is assumes an alert role. Alternatively, it may have been emitting an initial version of the visual alert in an alert role already, in which case it adopts an enhanced alert role (i.e. taking on the role of the failed luminaire on top of the role it is already performing) in which that version of the alert is modified to compensate for the failure of the mains-powered luminaire 4M to increase its visual impact, for example by increasing its brightness (luminous intensity) or changing its colour.

Should the availability of bridge and/or mains-powered lamps reduce further (S16; "Is availability of bridge/lamps reduced further?"), then the version of light effect emitted from the battery-powered luminaire 4B by be (further) modified to account for this, i.e. to (further) increase its impact (S18; "Increase light effect"). Successive increases can continue until they are no longer possible (S20; "Is effect at its maximum?"), for example because the battery-powered lamp has now reached its maximum brightness rendering further brightness increases impossible. Depending on the implementation, battery lifetime may be added as a parameter to clip the effect. That is, one or more characteristics of the alert can be set in dependence on a remaining energy in the battery. If the battery charge was already low, it might be beneficial to keep a low brightness but for a longer period of time to ensure proper detection, while something much brighter could disappear before someone notices it. However, in case of an alert, providing an adequate warning may be more important than preserving battery-life. Thus in other implementation, battery life may not be taken into account.

Successively increasing the brightness in this way if and when more lamps become unreachable can help to conserve energy, making the battery 38 last for longer. It is also a way of conveying more detailed information about what is happening within the lighting network 30, and can be an effective way of deterring an intruder by escalating the response of the system 1 in response to his continued attempts to disable it.

Once operating in the enhanced alert mode, the visual alert from the battery-powered luminaire 4B can only be terminated by an authorized source (S22; "Is effect cancelled via an authorized source?"). In order to prevent an intruder from disabling it, the control logic 34 of the battery-powered luminaire may disable any local user input device (e.g. button or buttons) of the battery-powered luminaire 4B to prevent it from being disabled locally. In that event, the battery powered lighting device cannot be turned off using a local control option (e.g. buttons) when it is emitting the notification effect. This means that, whilst an intruder may be able to switch of the mains lamps 4M, he will end up with one or more battery powered lighting devices that continue the notification with increased visibility and cannot be turned off.

An authorized user 8 can still switch off the effect using the app on the user device 6, for example, which causes the battery-powered luminaire 4B and any still reachable mains luminaires 4M to stop emitting visual alerts, and return to the state they were in at step S2 (S24 "Stop light effects") with the enhanced alert mode disabled (S26) and the normal operating mode resumed.

In some embodiments, the system may disable the commissioning/onboarding/acceptance of new users while in alert mode: If, for example, the bridge 10 is still working an intruder might try to connect to it as if it was a new user and eventually turn off the lamps as an "authorized" user; the system can block this to make sure that only users that were known to the system before the alert are the authorized ones. However with this approach, there may be a risk of a legitimate user being locked-out, for example if he has lost his phone etc. One solution would be to allow the addition of a new user/device only when a predetermined override code is provided (and, of course, adding any new user would require the bridge 10 to be repowered if it has been cut off).

Returning briefly to FIG. 3, it is noted that, from the perspective of a battery powered luminaire 4B, a main-powered luminaire can fail in the sense that it can no longer communicate with the battery powered luminaire 4B. However, this might occur not because that luminaire has lost power but because one of the intermediate nodes in the network, i.e. that is needed to relay data between the battery-powered luminaire 4B and mains-powered luminaire 4M such as another of the luminaires and/or the bridge 10 has lost power. It may not be possible for the battery powered luminaire 4B to distinguish between these different types of failures.

Preferably, if the battery-powered device detects that another node in the network 300 is not responding, it simply enables its own version of the visual alert. This would mean that, if the battery-powered device thinks that something crashed and it actually didn't, the alert will be provided twice the alert. This is not an issue since the aim is for the actual detection of the alert by the user.

If an alert fails to be deployed to a lamp that was indeed still powered but due to an intermediate link disappearing the message didn't reach it, the battery-powered device should still behave in the same way; at most there will be one lamp ignoring the rest of the system, but the system does succeed in deploying the alert somewhere, i.e. at the battery-powered device 4M at least.

If it is actually the battery-powered device 4B that gets cut off from the rest of the network 300 because of an intermediate link failing, then it would assume that an alert should be triggered. In a sense this is a false positive (and the only case of a false positive)—although, in fact, the alert serves as a useful warning that the lamp is not within reach of the network and the user should do something about it.

It would be possible to implement an auto recover process, such that when the battery-powered gets signal from the relevant network node again it cancels the alert. However, it may be preferable to always force an authorized user to disable it; otherwise there is a possible risk that the the intruder could start connecting/disconnecting the lamps to make an alert ineffective.

To provide further illustrations, some example use case scenarios will now be described.

EXAMPLE 1

Security

Assuming the presence of a burglar has been detected via a motion sensor of the system, causing it to enter the alert mode, in which all of the mains and battery-powered luminaires 4M, 4B emit an initial visual alert. In this scenario, the burglar may seek to limit the impact of the resulting visual effect and therefore, after having tripped the alarm, starts going from room to room turning off all mains-powered lamps 4M (and the bridge 10) via the legacy wall switches, effectively cutting power to them.

As this happens, a battery powered luminaire 4B can take two preventive actions:

First, it can detect that while in alert mode not just the bridge 10 disappeared but within a "suspicious" time window also other mains 4M powered devices in the network became disconnected, potentially linked to the burglar disabling the lamps. As a result, the battery-powered luminaire 4B can decide to increase the intensity of the effect to compensate for the loss of the mains lamps 4M and additionally make it even more off putting for the burglar to continue inside the house. For example, if the "basic" alert effect was to blink red at a particular rate, the battery-powered luminaire can inform all remaining lamps to make the brightness swing larger or even faster, i.e. increasing the blinking rate (or more generally by increasing a rate of dynamic variations of the dynamic effect). This increase can be made after each additional disappearance of a lamp, as a way of discouraging the burglar who can see that his actions are in fact escalating the increases and thus making his presence more noticeable, contrary to his nefarious intentions.

The battery-powered luminaire 4B may be portable, which in turn might make it harder for the burglar to determine where it is, or the time it takes for him to realize that the wall switches don't work with it may buy enough extra time for the alert to notify someone. Nevertheless, the battery-powered luminaire 4B under this enhanced alert mode can choose to ignore any local controls it may have such that even if the burglar finds it he will not be able to turn it off (and the battery can be integrated inside the luminaire, to prevent him removing it).

In this situation, the system again relies on the existence of battery based devices (luminaire and sensor) to overcome the countermeasures taken by the burglar.

EXAMPLE 2

Safety

In a different scenario, the system 1 is used together with a smoke alarm to trigger visual effects whenever there is a fire in the kitchen. Under these conditions, the lights have, for example, a pulsating blue light.

This system is set to automatically go into alert mode when presence is detected in, say, the kitchen (because someone is cooking) or at night (in case e.g. someone left the oven on overnight and it burns something).

Normally the system 1 is configured to only trigger lamps in the kitchen and its immediate vicinity as it is expected that there will be a user nearby to handle any issue that might arise. However, in some cases the user might not be around or might be sleeping and the localized warning is not sufficient, though the system has no way of knowing this. Should this happen, the fire may spread enough that it starts affecting the lights in charge of deploying the visual alert, either by destroying or damaging directly or by causing malfunctions that disable the power supply towards them.

The system 1 can be tuned to (when in alert mode) be extra sensitive to missing/disappearing devices in the network. In this case, however, the system may choose to deploy the effect farther away and into other areas instead of making it more intense. For example, it can choose to involve lights in other rooms (like basement, bedrooms, and bathrooms) such that if this happened while the user was sleeping or taking a bath the notification still reaches him/her. In particular, a battery-powered luminaire 4B that has not up to this point been emitting any visual alert can begin doing so when a mains-powered luminaire 4M fails, to take over from it.

If the system 1 notices that after some time the situation is not fixed or more devices are disappearing from the network (due to more malfunctions/damages), the effect can be taken even further (e.g. other floors, more lamps, etc.).

In this situation, battery-based devices can once again take a leading role in coordinating these actions as they would be less susceptible to malfunctions in the power supply and can remain generating the visual effects for a longer period of time.

It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller for controlling a battery-powered luminaire in a lighting network, the controller comprising:
    a network interface for communicating with the lighting network; and
    control logic for controlling at least one illumination source of the battery-powered luminaire;
wherein the control logic is configured to:
    detect a failure of at least one mains-powered luminaire in the lighting network, determine that the mains-powered luminaire was emitting or had been instructed to emit a visual alert when the failure occurred, and control the at least one illumination source of the battery-powered luminaire to assume an alert role, if it is not yet emitting a visual alert, or, if it is emitting an initial version of a visual alert, to modify the initial version of the visual alert and emit such modified version of the visual alert in response, the failure being detected based on a loss of communication, within the lighting network, with the mains-powered luminaire,
    wherein the control logic is configured to disable a local user input device of the battery-powered luminaire whilst the version of the visual alert is being emitted by the battery-powered luminaire, thereby preventing local termination of that alert at the battery-powered luminaire.

2. A controller according to claim 1, wherein the control logic is configured to modify at least one visual characteristic of the visual alert, the version of the visual alert emitted by the battery-powered luminaire exhibiting the modified visual characteristic.

3. A controller according to claim 2, wherein the at least one modified visual characteristic comprises:
    an increased light intensity,
    an increased rate of dynamic variations, and/or
    a modified colour of light.

4. A controller according to claim 2, wherein the failure of the mains-powered luminaire occurs when the at least one illumination source of the battery-powered luminaire is emitting an initial version of the visual alert, and in response to said determination the control logic modifies the initial version of the visual alert emitted by the battery-powered luminaire so as to cause it to exhibit the modified visual characteristic.

5. A controller according to claim 1, wherein the control logic is configured to control the at least one illumination source of the battery-powered luminaire to emit the version of the visual alert based on sensor data received from a sensor via the network interface.

6. A controller according to claim 5, wherein the sensor data is received initially from the sensor via a control node of the lighting network, wherein the control logic is configured, in response to detecting a failure of the control node, to attempt to connect to the sensor of the lighting network directly or via one or more nodes of the lighting network other than the control node, to continue receiving the sensor data.

7. A controller according to claim 1, wherein the failure of the mains-powered luminaire is one of series failures detected in the lighting network by the control logic, wherein the control logic is configured to apply an analysis to the series of failures, and control the at least one illumination source of the battery-powered luminaire to emit the version of the visual alert in response to the analysis determining that the series of failures is unexpected.

8. A controller according to claim 7, wherein the control logic is configured to apply successive modifications to the lighting effect in response to continuing unexpected failures in the lighting network.

9. A battery-powered luminaire for use in a lighting network, the battery-powered luminaire comprising:
    a battery configured to power the luminaire;
    at least one illumination source for emitting light to provide illumination; and
    a controller according to claim 1.

10. A method of controlling a battery-powered luminaire in a lighting network, the method comprising steps of:
    detecting a failure of at least one mains-powered luminaire in the lighting network, the failure being detected based on a loss of communication, within the lighting network, with the mains-powered luminaire;
    determining that the mains-powered luminaire was emitting or had been instructed to emit a visual alert when the failure occurred; and
    controlling the at least one illumination source of the battery-powered luminaire to assume an alert role, if it is not yet emitting a visual alert, or, if it is emitting an initial version of a visual alert, to modify the initial version of the visual alert and emit such modified version of the visual alert in response,
    wherein a local user input device of the battery-powered luminaire is disabled whilst the version of the visual alert is being emitted by the battery-powered luminaire, thereby preventing local termination of that alert at the battery-powered luminaire.

11. A method according to claim 10, comprising a step of modifying at least one visual characteristic of the visual alert, the version of the visual alert emitted by the battery-powered luminaire exhibiting the modified visual characteristic.

12. A method according to claim 11, wherein the at least one modified visual characteristic comprises:
    an increased light intensity,
    an increased rate of dynamic variations, and/or
    a modified colour of light.

13. A method according to claim 11, wherein the failure of the mains-powered luminaire occurs when the at least one illumination source of the battery-powered luminaire is emitting an initial version of the visual alert, and in response to said determination, the initial version of the visual alert emitted by the battery-powered luminaire is modified so as to cause it to exhibit the modified visual characteristic.

14. A computer program product comprising code stored on a non-transitory computer readable storage medium and configured when executed to implement the method of claim 10.

* * * * *